US012806775B2

(12) United States Patent
Roberts et al.

(10) Patent No.: US 12,806,775 B2
(45) Date of Patent: Nov. 24, 2026

(54) MONITORING A RESOLVER

(71) Applicant: ABB Schweiz AG, Baden (CH)

(72) Inventors: Richard Roberts, Gilching (DE); Werner Hösl, Nabburg (DE)

(73) Assignee: ABB Schweiz AG, Baden (CH)

( * ) Notice: Subject to any disclaimer, the term of this patent is extended or adjusted under 35 U.S.C. 154(b) by 175 days.

(21) Appl. No.: 18/796,971

(22) Filed: Aug. 7, 2024

(65) Prior Publication Data

US 2024/0391098 A1 Nov. 28, 2024

Related U.S. Application Data

(63) Continuation of application No. PCT/EP2022/053089, filed on Feb. 9, 2022.

(51) Int. Cl.
*G01D 5/20* (2006.01)
*B25J 9/16* (2006.01)
*G01D 18/00* (2006.01)

(52) U.S. Cl.
CPC .......... *B25J 9/1641* (2013.01); *G01D 5/2066* (2013.01); *G01D 18/00* (2013.01)

(58) Field of Classification Search
CPC ....... B25J 9/1641; G01D 3/08; G01D 5/2066; G01D 5/2073; G01D 18/00
See application file for complete search history.

(56) References Cited

U.S. PATENT DOCUMENTS 7,513,169 B2 4/2009 Noritou
10,884,037 B2 1/2021 Chellamuthu et al.
2007/0251332 A1* 11/2007 Noritou ................ G01D 5/2073 73/862.326
2009/0206828 A1* 8/2009 Yamaura .................. G01B 7/30 318/400.38
2018/0073895 A1* 3/2018 Chellamuthu ........... G01D 3/08

FOREIGN PATENT DOCUMENTS

SE 1451279 A1 5/2015

OTHER PUBLICATIONS

European Patent Office, International Search Report in International Patent Application No. PCT/EP2022/053089, 4 pp. (Sep. 15, 2022).
European Patent Office, Written Opinion in International Patent Application No. PCT/EP2022/053089, 6 pp. (Sep. 15, 2022).

* cited by examiner

*Primary Examiner* — Tung X Nguyen
(74) *Attorney, Agent, or Firm* — Whitmyer IP Group LLC

(57) ABSTRACT

A method for monitoring a resolver having first and second winding assemblies, the first winding assembly having a sine winding and a cosine winding arranged so that when inductive coupling between the sine winding and the second winding assembly is zero, inductive coupling between the cosine winding and the second winding assembly is at a maximum, and when inductive coupling between the cosine winding and the second winding assembly is zero, inductive coupling between the sine winding and the second winding assembly is at a maximum, the method including obtaining a master amount of total inductive coupling between the first and second winding assemblies of the resolver; obtaining a current amount of total inductive coupling at a current instant in time; and deciding that the resolver is defective when a difference between the current amount and the master amount exceeds a predetermined threshold.

13 Claims, 2 Drawing Sheets

MONITORING A RESOLVER

CROSS-REFERENCE TO RELATED APPLICATIONS

The instant application claims priority to International Patent Application No. PCT/EP2022/053089, filed Feb. 9, 2022, which is incorporated herein in its entirety by reference.

FIELD OF THE DISCLOSURE

The present disclosure generally relates to methods and apparatus for monitoring a resolver and, more particularly, to monitoring a resolver associated to a joint in an articulated robot arm.

BACKGROUND OF THE INVENTION

An articulated robot arm comprises a plurality of links, which are coupled to each other, to a base or to an end effector by rotatable joints. A link of such a robot arm usually houses a motor and a gear for driving the rotation of a neighboring joint, and power and signal wires for the motor of this link and for motors of more distal links and, possibly, of the end effector. In operation, movement of the robot tends to wear on the isolation of the wires. In many cases, the isolation will not break down abruptly, but its resistance will decrease gradually, thereby distorting measurement signals that are fed back to a controller. Such distortion can cause the controller to derive from the measurement signals a position of the robot that differs from the real position. Such a deviation not only affects the precision with which the robot can carry out a given task but can cause the robot to violate safety limitations (e.g. position limits) and thus potentially endanger people in its vicinity. In general, the lower the isolation resistance, the larger the potentially undetected position error.

Conventionally, a resolver comprises first and second winding assemblies, which are rotatable with respect to each other and are inductively coupled so that when a current is flowing in one of the assemblies, a voltage will be induced in the other. One of these assemblies, here referred to as the first winding assembly, has a sine winding and a cosine winding arranged so that when inductive coupling between the sine winding and the second winding assembly is zero, inductive coupling between the cosine winding and the second winding assembly is at a maximum, and when inductive coupling between the cosine winding and the second winding assembly is zero, inductive coupling between the sine winding and the second winding assembly is at a maximum.

Theoretically, the total inductive coupling between the first and second winding assemblies does not depend on the relative orientation of the winding assemblies. I.e. when the exciting current is passed through the second wiring assembly, the sum of squares of the voltages induced in sine and cosine windings should be independent of relative orientation, and if it is passed though the sine and cosine windings, the voltage induced in the second winding assembly should be independent of orientation. However, when there is a short circuit or a reduced isolation resistance in the wires associated to a winding of the first winding assembly, a voltage induced in that winding or a current supplied to it will be shunted, so that the apparent total inductive coupling becomes dependent on orientation.

Regrettably, the total coupling may also be influenced by various other factors. Installation and manufacturing tolerances can lead to harmonics being induced in the measurements, which in turn lead to variations in the total inductive coupling that depend on the orientation of the shaft and degrade the precision with which the relative orientation of the winding assemblies of a given resolver can be inferred from the measured inductive coupling. Such tolerances may also cause the coupling to vary globally from one resolver to another. Coupling may also depend on the operating temperature of the resolver, so that in the course of time it may vary quite unpredictably.

In order to avoid detection of a failure when the resolver is actually operating normally, some fluctuations of the inductive coupling therefore have to be allowed. If total coupling in a resolver is found to vary by e.g. ±10% due to variations of operating temperature, it may be necessary to allow variations of total inductive coupling of ±20% to be reasonably certain not to detect a failure of the resolver when the deviation is actually due to a change in temperature. In a situation where the second winding assembly of the resolver faces the cosine winding, the voltage induced there by a current flowing in the second winding assembly is 100%, and there is a short circuit in the sine winding, this short circuit wouldn't be detected before the coupling has dropped by 20% to 80%, i.e. unless the assemblies have rotated with respect to each other by an angle $\theta$, which satisfies $\cos(\theta)=0.8$. Position detection by the resolver can thus be wrong by up to $\theta=\pm 36.9°$ before a malfunction of the resolver is detected.

In fact, if a worst case calculation is performed, then for a given resolver, the maximum coupling may be up to 120% of the rated value. In such a case, there can be a rotation by up $\theta=\arccos(0.8/1.2)=\pm 48.2°$ before a malfunction is detected.

When there is no short circuit, but isolation resistance is merely reduced, tolerances are still larger, and a decrease in isolation resistance is likely to go unnoticed until shortly before the isolation breaks down completely.

BRIEF SUMMARY OF THE INVENTION

There is thus a need, in particular in collaborative robot applications, for a resolver and for a resolver monitoring method by means of which such a breakdown can be detected with as small a position error as possible. The present disclosure describes a method for monitoring a resolver, the resolver comprising first and second winding assemblies which are rotatable with respect to each other and are inductively coupled, the first winding assembly having a sine winding and a cosine winding arranged so that when inductive coupling between the sine winding and the second winding assembly is zero, inductive coupling between the cosine winding and the second winding assembly is at a maximum, and when inductive coupling between the cosine winding and the second winding assembly is zero, inductive coupling between the sine winding and the second winding assembly is at a maximum, the method comprising the steps of a) obtaining a master amount of total inductive coupling between the first and second winding assemblies of said resolver, b) obtaining at least one current amount of total inductive coupling at a current instant in time, c) deciding that the resolver is defective if a difference between the current amount and the master amount exceeds a predetermined threshold.

Since the master amount is obtained from the resolver, which is being monitored, the threshold doesn't have to take account of those manufacturing tolerances that would cause the inductive coupling of the resolver in question to deviate permanently from that of another resolver of identical design. The threshold can thus be set more narrowly without increasing the risk of erroneously deciding that the resolver is defective.

BRIEF DESCRIPTION OF THE SEVERAL VIEWS OF THE DRAWING(S)

DETAILED DESCRIPTION OF THE INVENTION

Figure 1:
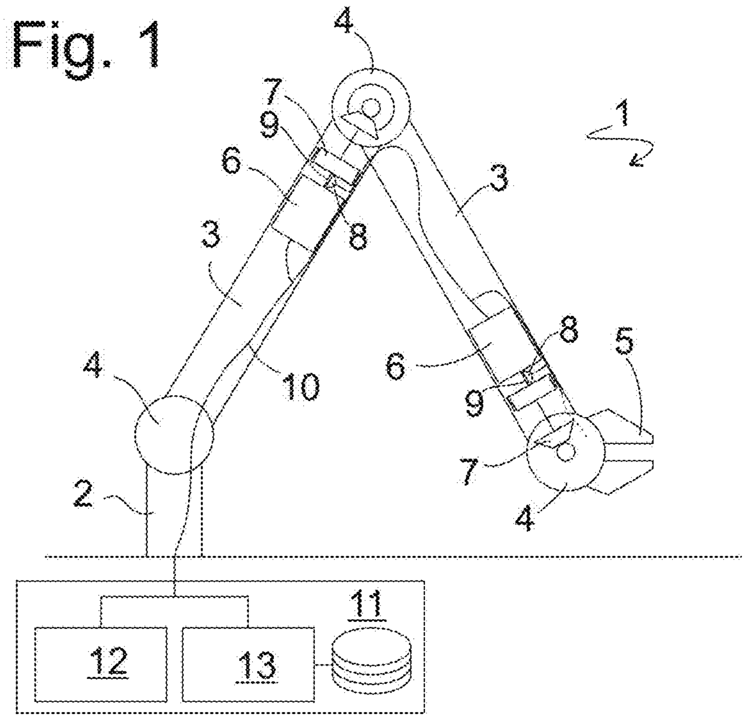
FIG. 1 is a schematic view of a robot and its controller in accordance with the disclosure.

FIG. 1 is a schematic view of a robot system comprising an articulated robot arm 1. The robot arm 1 has a stationary base 2 fixed to a support, and a plurality of links 3 rotatably connected to each other and to the base 2 by joints 4. The most distal link carries an end effector 5. The links 3 are shown with part of their casing removed, so that motors 6 and gears 7 for driving rotation of the joints 4 can be seen inside the casing. A resolver for measuring a rotation position could be mounted at the axis of rotation of each joint 4; in the embodiment of FIG. 1 a resolver 8 is mounted at a shaft 9 extending from the motor 6 to the reducing gear 7.

A wire harness 10 extends along the articulated arm 1 between a controller 11 on one end and the motors 6 and resolvers 8 on the other, supplying the motors 6 with energy from a power supply circuit 12, and feeding back output from the resolvers 8 to a processor 13. The wire harness 10 must adapt to every movement of the robot arm 1, which may wear down the isolation of individual wires in it.

Figure 2:
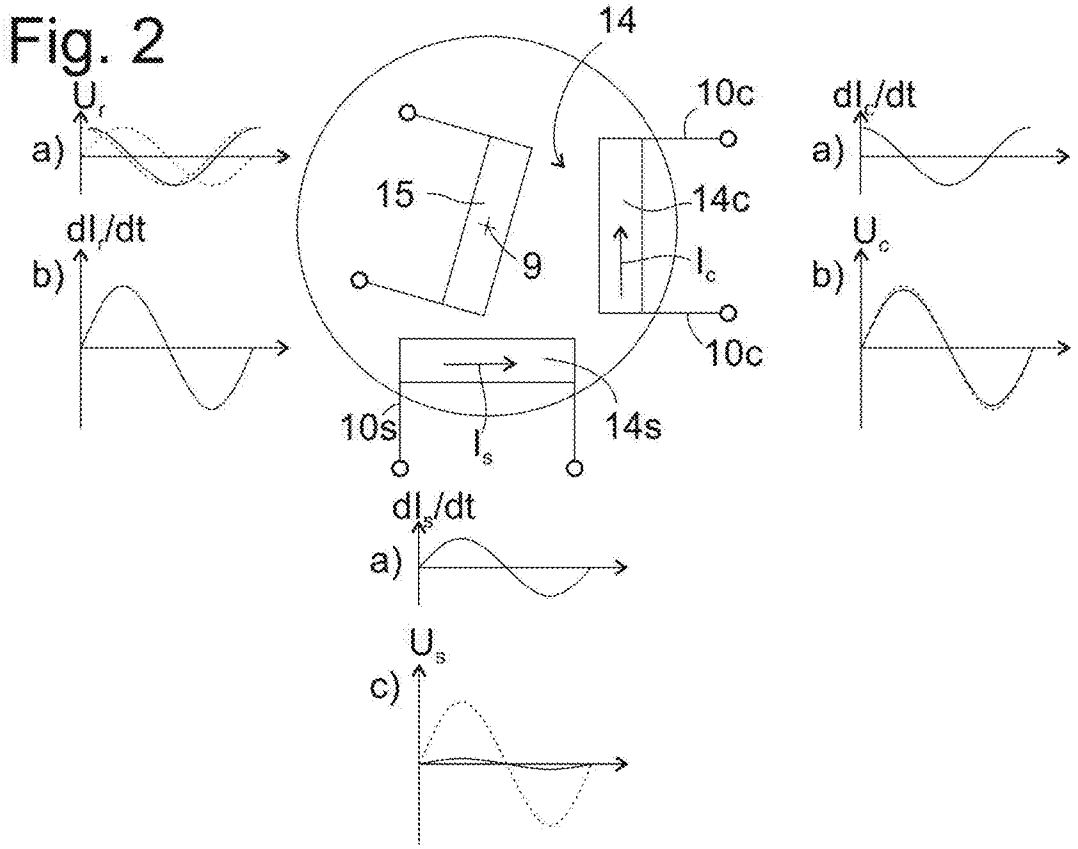
FIG. 2 is a schematic diagram of a resolver in accordance with the disclosure.

FIG. 2 is a schematic diagram of one of said resolvers 8. The resolver 8 has two winding assemblies 14, 15 which are rotatable with respect to one another. Assembly 14 comprises two windings, referred to as sine winding 14*s* and cosine winding 14*c*, whose axes extend at right angles to one another in a plane perpendicular to the axis of rotation, i.e. to shaft 9. Assembly is a single winding which, when rotated by shaft 9, alternatingly faces either sine winding 14*s* or cosine winding 14*c*. In one of the assemblies 14, 15, windings are directly connected to the controller 11 by dedicated wires 10*c*, 10*s* of harness 10; in the other, preferably assembly 15, connection is made via a sliding contact or by inductive coupling.

The resolver 8 can operate in a stator excitation regime or a rotor excitation regime. In stator excitation regime, excitation currents Is, Ic from power supply circuit 12 having a 90° phase shift flow through windings 14*s*, 14*c*, as illustrated in diagrams a) next to these windings in FIG. 2. Winding assembly 15 rotates in the combined magnetic fields of both windings 14*s*, 14*c*. The frequency of the excitation currents Is, Ic is much higher than the rotation frequency of shaft 9, preferably above 1 kHz, so that induction in winding 15 due to rotation is negligible. Depending on orientation of the winding 15, currents in sine and cosine windings 14*s*, 14*c* contribute in variable proportions to the voltage Ur induced in winding 15. Thus, in normal operation, the amplitude of the induced voltage Ur is constant, and its phase is representative of orientation of the shaft 9.

If a short circuit occurs in the wires 10*s* of sine winding 14*s* while the winding 15 faces the cosine winding, this will have no effect on the induced voltage, Ur, since in this orientation the sine winding 14*s* doesn't contribute.

When the shaft 9 continues to rotate, the phase of the induced voltage Ur will not change; so the controller 11 receives no feedback that the joint is actually moving. Instead, the amplitude of the induced voltage Ur gradually decreases, and a failure can be diagnosed when the amplitude has dropped below an appropriately defined threshold.

Figure 3:
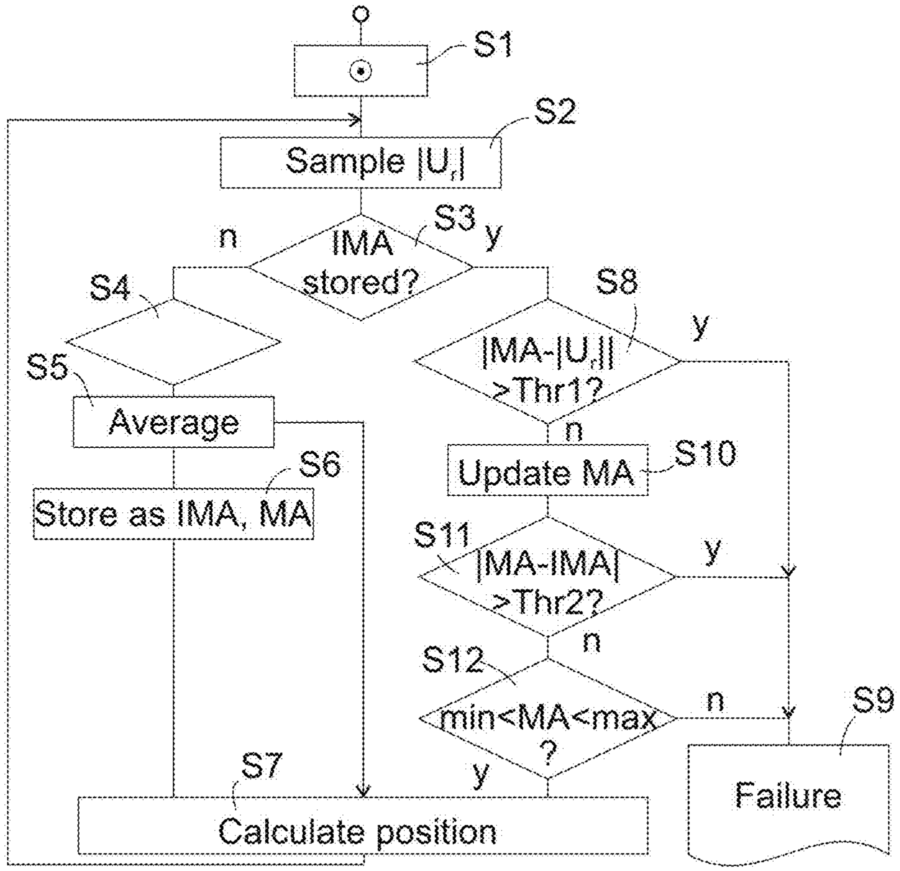
FIG. 3 is a flowchart of a resolver monitoring method carried out by the controller in accordance with the disclosure.

FIG. 3 is a flowchart of a method for monitoring the functionality of the resolver 8 carried out by processor 13 of controller 11. In step S1, the controller 11 is switched on, and power supply circuit 12 starts providing alternating current to windings 14*s*, 14*c*. When these are stable, a sample of the amplitude |U| and phase of the voltage U induced in winding 15 is taken in step S2.

Step S3 checks whether an initial master amount IMA of this amplitude has been stored previously. If this is not the case, i.e. if the resolver 8 is used for the very first time, the sample obtained in step S2 may be stored as the IMA in step S6. Alternatively, in order to reduce the influence of noise or if it has to be expected that the amplitude will change on a short timescale, for example, due to the resolver becoming warm in operation, the IMA can be based on several samples.

In step S4, it is decided whether a sufficient number of samples has been collected or some other appropriate criterion is fulfilled. If not, the process calculates the position of winding 15 based on the phase of the sample (S7), waits for a predetermined time interval to pass and returns to S2 in order to obtain another sample. If yes, an average of the collected samples is obtained (S5), and the result is stored (S6) as both the IMA and as a potentially time-variable master amount MA, to be discussed in detail later. The average of step S4 can be obtained in any appropriate way, by feeding the samples in analog form through a low-pass filter or by performing calculations, e.g., calculating a floating average, on the samples in digital form.

After the IMA and the MA have been calculated and stored, the process branches from step S3 to step S8 in which the difference between the MA and the sample amplitude |U| is calculated and compared to a threshold Thr1. Since the IMA has been obtained specifically for the resolver in question, and the MA has been adapted based on earlier sample amplitudes |U| obtained for this resolver, the threshold Thr1 doesn't have to allow for differences in inductive coupling between different resolvers of the same design, nor for temperature-dependent variations of the inductive coupling, and can be set to a small value. Considering the fact that in normal operation the amplitude |U| should not change at all, the threshold can be set to a few % or even less of MA.

If this threshold Thr1 is exceeded, it is concluded in step S9 that the resolver is defective. The controller then stops all movement of the robot arm 1 and outputs a message describing the defect. If the threshold Thr1 is not exceeded, the resolver appears to be operating normally. In that case the sample |U| is used for updating the MA in step S10. Similar to step S5, this can be done by low-pass filtering successive samples |U| or by calculation. For example, when an n-th sample |Un| has been obtained in S2, and the current master amount MAn-1 has been obtained based on the preceding n−1 samples, an updated master amount MAn can be calculated as $MAn=(1-\varepsilon)\ MAn-1+\varepsilon|Un|$, wherein ε is a positive real number much smaller than 1. A specific choice of & or of the time constant will have to take into account details of the resolver and of its environment; the time constant should be small enough to ensure that changes of |U| due to reversible effects which aren't representative of isolation wear, in particular temperature changes occurring under normal operation of the robot arm 1, won't cause the threshold Thr1 to be exceeded.

In an alternative embodiment, the IMA might be predefined by the manufacturer, typically to have a same value for all resolvers of identical design. In that case, when the resolver is started for the first time, the master amount MA is set equal to the IMA, and the method proceeds from S2 directly to S8.

Theoretically, when one of windings 14*s*, 14*c* is short-circuited and the shaft 9 rotates extremely slowly, the updating of S10 might allow MA to adapt to the change in |U|, so that the shaft 9 might rotate indefinitely without the short circuit being detected. In practice, this is not a problem, since the change of |U| would have to occur on a timescale similar to that of heating effects. However, so slow a movement will not present a safety problem to persons in the vicinity of the robot arm 1.

Further, even such a slow movement or other slow changes in the resolver, such as aging effects, will be detected in step S11, in which the difference between the updated MA and the IMA is compared to a threshold Thr2, and/or it is verified whether in step S12 the updated MA is within an allowable range [min, max], which may be specified by the manufacturer of the resolver for all resolvers of a given design. This threshold can amount to several percent, e.g. up to 10 or 20, of the IMA. When this threshold is exceeded, or the updated MA is outside the allowable range [min, max], the process branches to S9, already described above; else the sample |U| is 30 used in step S7 to calculate the position of the winding 15.

When the isolation is wearing down somewhere in wire harness 10, movements of the robot arm 1 may cause leak current through the isolation to vary wildly. While the resolver may be working perfectly most of the time, there may be an occasional short instant when a defective spot of the isolation touches a conductive surface adjacent to the wire harness, and the induced voltage breaks down. Therefore, additionally or as an alternative to steps S11, S12 described above, the resolver can be judged to be defective when |Ur| is outside the allowable range [min, max].

In rotor excitation regime, an excitation current Ir from power supply circuit 12 flows through winding assembly 15, as illustrated in diagram b) next to winding 15 in FIG. 2. When winding assembly 15 faces cosine winding 14*c*, the voltage Uc induced in it is at a maximum, shown as a dotted line in the diagram b) adjacent to winding 14*c*, whereas the voltage induced Us in 15 winding 14*s* is zero. In the configuration of FIG. 2, with winding assembly 15 rotated slightly out of parallel to winding 14*c*, Uc is slightly reduced, as shown by a solid line in the associated diagram, and nonzero induction is visible in diagram b) of winding 14*s*. In normal operation, the sum of squares of these voltages should be constant. However, when there is an insulation defect in the wires extending from winding 14*s* to the controller 11, this voltage will be short-circuited, which affects the sum of squares of the voltages detected by the controller 11.

Figure 4:
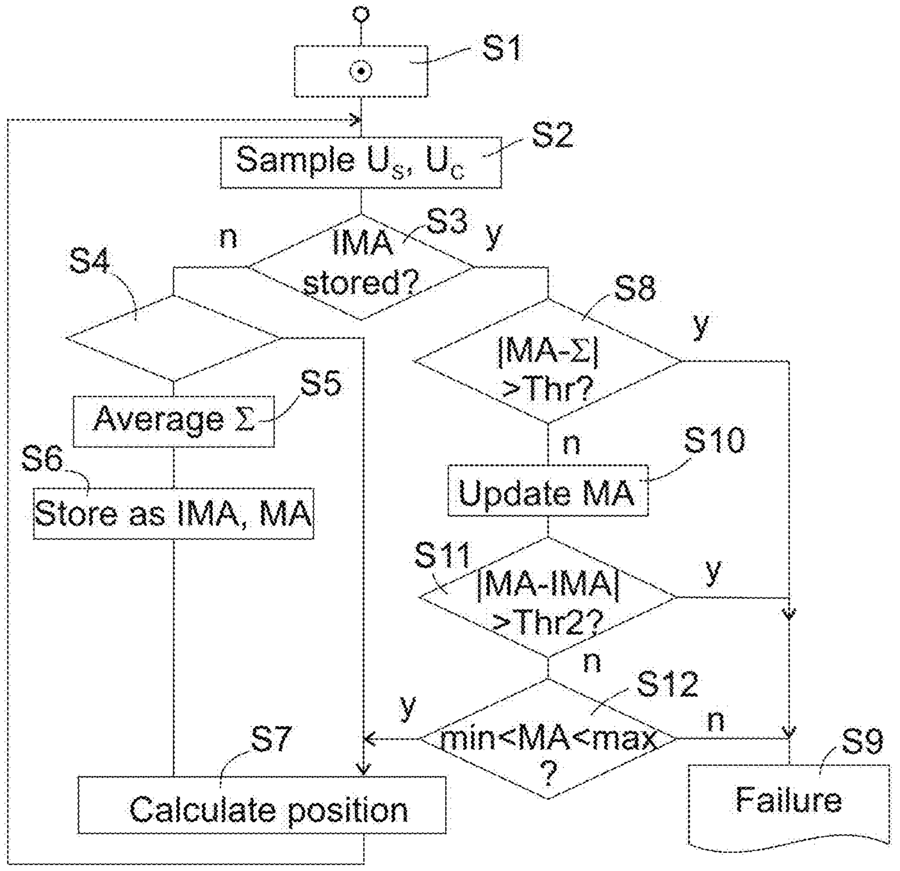
FIG. 4 is a flowchart of an alternative embodiment of a resolver in accordance with the disclosure.

FIG. 4 is a flowchart of a method for monitoring the resolver 8 in rotor excitation regime. In step S1, the controller is switched on, and power supply circuit 12 starts providing alternating current Ir to winding assembly 15. When the current Ir is stable, samples of the amplitudes |Us|, |Uc| induced in windings 14*s*, 14*c* are taken in step S2, and a sum of squares $\Sigma=|Us|^2+|Uc|^2$ of these is calculated.

Step S3 checks whether an initial master amount IMA of this sum has been stored previously. If this is not the case, i.e. if the resolver 8 is used for the very first time, the sample sum obtained in step S2 may be stored as the IMA in step S6. Alternatively, if it has to be expected that the amplitudes |Us|, |Uc| will change on a short timescale e.g. due to the resolver 8 becoming warm in operation, the IMA can be based on several samples.

In step S4, it is decided whether a sufficient number of samples has been collected or some other appropriate criterion is fulfilled. If not, the process calculates the position of winding 15 based on the ratio and the phase relationship of the samples Us, Uc (S7), waits for a predetermined time interval to pass and returns to S2 in order to obtain another sample. If yes, an average of the sums of squares Σ of the collected samples is obtained (S5), and the result is stored (S6) as both the IMA and as a potentially time-variable master amount MA.

The average of step S4 can be obtained in any appropriate way, by feeding the input data Σ in analog form through a low-pass filter or by performing calculations, e.g. calculating a floating average, on these in digital form.

After the IMA and the MA have been calculated and stored, the process branches from step S3 to step S8. Step S8 calculates the difference between the MA and the sum of squares Σ obtained in the preceding iteration of step S2. If there is a short circuit in the wires of either the sine or the cosine winding, only induction in the other will contribute to the sum of squares Σ. So, while winding assembly 15 is facing e.g. the cosine winding 14*c*, a short circuit in the wires of sine winding 14*s* cannot be detected, but when winding assembly 15 begins to turn towards sine winding 14*s*, the contribution of Uc to Σ decreases so that the difference will finally exceed a threshold Thr1, and will cause failure of the resolver to be detected in step S9.

If no failure is detected, the sample sum Σ is used for updating the MA in step S10 as described above referring to FIG. 3. As above, a slow movement or other slow changes in the resolver, such as aging effects, will be detected in step S11, in which the difference between the updated MA and the IMA is compared to a threshold Thr2 and/or to the allowable range. Also, in analogy to the method of FIG. 3, it can be checked whether $\sqrt{\Sigma}$ is inside the allowed range [min. max].

According to an aspect of the present disclosure, a method for monitoring a resolver is described, the resolver comprising first and second winding assemblies which are rotatable with respect to each other and are inductively coupled, the first winding assembly having a sine winding and a cosine winding arranged so that when inductive coupling between the sine winding and the second winding assembly is zero, inductive coupling between the cosine winding and the second winding assembly is at a maximum, and when inductive coupling between the cosine winding and the second winding assembly is zero, inductive coupling between the sine winding and the second winding assembly is at a maximum, the method comprising the steps of a) obtaining a master amount of total inductive coupling between the first and second winding assemblies of said resolver, b) obtaining at least one current amount of total inductive coupling at a current instant in time, c) deciding that the resolver is defective if a difference between the current amount and the master amount exceeds a predetermined threshold. Since the master amount is obtained from the resolver, which is being monitored, the threshold doesn't have to take account of those manufacturing tolerances that would cause the inductive coupling of the resolver in question to deviate permanently from that of another resolver of identical design.

The threshold can thus be set more narrowly without increasing the risk of erroneously deciding that the resolver is defective. Step a) may comprise the steps of a1) obtaining at least one master sample of total inductive coupling between the first and second winding assemblies of said resolver at an instant in time different from said current instant, and a2) determining the master amount based on said at least one master sample.

When applied to resolver in an articulated robot arm, at least steps b) and c) will be periodically repeated while the robot is operating, in order to ensure that the robot won't move far enough to endanger a person in its vicinity before a possible defect of the resolver is detected and triggers a stop of the robot.

Step a) might be carried out just once, but is preferably also repeated periodically in order to enable updating the master amount, e.g. by low pass filtering or averaging of successive master samples. Thus the master amount can adapt to changes in the inductive coupling due to slow reversible changes of operating conditions, e.g. of operating temperature of the resolver. In order to prevent the master amount from also adapting to changes of position of the resolver, a time constant with which said low pass filtering or averaging adapts to a change of the master samples should be long in comparison to the operation cycle of the robot. A time constant of at least a minute, preferably several minutes or even hours is adequate.

While the amount of inductive coupling may vary from one resolver to another of identical design, an allowable range in which such variations are accepted should be limited in absolute terms, so that a resolver whose inductive coupling is outside the allowable range is discarded as defective even when new. It may therefore be practical to carry out step a) before the resolver is installed in a robot, and to install it only if it is found in order. The amount of inductive coupling thus measured can be used as an initial master amount for the resolver in question after it has been installed, or the measurement can be repeated after installation.

Whenever the above-described adaptation causes the master amount to adopt a value outside the allowable range later on, especially while the robot is operating, this can be regarded as indicative of an irregularity that should also cause the resolver to be found defective.

Just like obtaining the master amount, obtaining a current amount can be based on obtaining a sample of total inductive coupling. In principle, one sample of total inductive coupling can be used for obtaining the current amount in step b) and deciding whether the resolver is defective in step c), on the one hand, and for updating the master amount to be used in step c) of a subsequent iteration of the method, on the other.

A judgment of the resolver as defective can also be based on a single sample of total inductive coupling falling outside the allowed range. The remedies adopted in case of such a judgment may differ depending on the kind of irregularity detected.

Conventionally, there are two different types of resolvers. In a first type, an alternating current is passed through the second winding assembly to induce a magnetic field, voltages induced by said magnetic field in sine and cosine windings of the first winding assembly are sampled, and a position of the resolver is deduced from these two voltages.

When applied to such a resolver, the monitoring method preferably comprises passing an alternating current through the second winding assembly to induce a magnetic field, sampling voltages induced by said magnetic field in sine and cosine windings of the first winding assembly, and using as said current sample or said master sample the sum of squares of said sampled voltages.

In a second, alternative type, first and second alternating currents having a same amplitude and a phase shift of 90° are supplied to sine and cosine windings of the first winding assembly, whereby a magnetic field is generated at the location of the second winding assembly, and the phase of the voltage induced thereby in the second winding assembly is indicative of the orientation of the second winding assembly. When applied to a resolver operating in this second mode, the monitoring method preferably comprises providing first and second alternating currents having a same amplitude and a phase shift of 90°, passing the first alternating current through the sine winding of the first winding assembly and passing the second alternating current through the cosine winding, so as to generate a magnetic field, sampling a voltage induced by said magnetic field in the second winding assembly, and using as said current or master sample the square of said sampled voltage.

When the master amount is updated while the resolver operates, changes in resolver characteristics occurring at a lifetime timescale will affect the master amount, and will thus not be detected by comparing the master amount to a current amount of inductive coupling. In order to recognize such slow changes and take account of them, the method may further comprise steps d) storing an initial master amount obtained by an initial execution of step a), and e) repeating step a) in order to obtain an updated master amount, and deciding that the resolver is defective if a difference between the initial master amount and the updated master amount exceeds a predetermined threshold.

Instead or additionally, irregularities of inductive coupling can be detected by d) storing an allowable range of the total inductive coupling, and e) repeating step a) in order to obtain an updated master amount, and deciding that the resolver is defective if the updated master amount is outside the allowable range.

When isolation is wearing down somewhere in the wiring of the resolver, and the wires are moved, a short circuit may occur just occasionally. Therefore, it may be appropriate to decide that the resolver is defective if a single sample of the total inductive coupling is outside the allowable range.

According to a second aspect, the present disclosure describe a resolver controller comprising a power supply for providing an alternating current to one of first and second winding assemblies of a resolver, measurement circuitry for measuring voltage induced in the other of said first and second winding assemblies by said alternating current, and a processor adapted a) to obtain a master amount of total inductive coupling between the first and second winding assemblies of said resolver from voltage data measured by said measurement circuitry, and b) to obtain at least one current amount of total inductive coupling at a current instant in time from voltage data measured by said measurement circuitry, and c) to decide that the resolver is defective if a difference between the current amount and the master amount exceeds a predetermined threshold.

The same controller can further be adapted to deduce an angular position of the resolver from the current amount of total inductive coupling. According to a further aspect, the above-enounced need is satisfied by a resolver assembly comprising the controller defined above, and a resolver associated to it. Such an assembly can further comprise an articulated robot arm having a joint to which the resolver is associated.

According to a still further aspect, a computer-readable storage medium having stored thereon a plurality of instructions which, when executed by a processor, causes the processor a) to obtain a master amount of total inductive coupling between the first and second winding assemblies of said resolver from input voltage data, and b) to obtain at least one current amount of total inductive coupling at a current instant in time from input voltage data, and c) to decide that the resolver is defective if a difference between the current amount and the master amount exceeds a predetermined threshold is described.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for monitoring a resolver, the resolver comprising first and second winding assemblies that are rotatable with respect to each other and are inductively coupled, the first winding assembly having a sine winding and a cosine winding arranged so that when inductive coupling between the sine winding and the second winding assembly is zero, inductive coupling between the cosine winding and the second winding assembly is at a maximum, and when inductive coupling between the cosine winding and the second winding assembly is zero, inductive coupling between the sine winding and the second winding assembly is at a maximum, the method comprising:

a) obtaining a master amount of total inductive coupling between the first and second winding assemblies of the resolver, the total inductive coupling being a sum of squares of voltages induced in the sine winding and the cosine winding of the first winding assembly or a square of a voltage induced in the second winding assembly;

b) obtaining a current amount of total inductive coupling at a current instant in time;

c) deciding that the resolver is defective when a difference between the current amount and the master amount exceeds a predetermined threshold;

d) storing an initial master amount obtained by an initial execution of step a); and e) repeating step a) to obtain an updated master amount, and deciding that the resolver is defective when a difference between the initial master amount and the updated master amount exceeds a predetermined threshold.

2. The method of claim 1, wherein step a) comprises a1) obtaining at least one master sample of total inductive coupling between the first and second winding assemblies of the resolver at an instant in time different from a current instant, and a2) determining the master amount based on the at least one master sample.

3. The method of claim 1, wherein a) is periodically repeated and comprises low pass filtering or averaging of successive master samples at a time constant of at least a minute.

4. The method of claim 1, wherein obtaining a current amount comprises obtaining a current sample of total inductive coupling.

5. The method of claim 2, wherein obtaining a current and/or obtaining a master sample comprises passing an alternating current through the second winding assembly to induce a magnetic field, sampling voltages induced by said magnetic field in sine and cosine windings of the first winding assembly, and using as the current sample or said master sample the sum of squares of the sampled voltages.

6. The method of claim 2, wherein obtaining a current and/or obtaining a master sample comprises providing first and second alternating currents having a same amplitude and a phase shift of 90°, passing the first alternating current through the sine winding of the first winding assembly and passing the second alternating current through the cosine winding so as to generate a magnetic field, sampling a voltage induced by said magnetic field in the second winding assembly, and using as said current or master sample the amount or the square of said sampled voltage.

7. The method of claim 1, further comprising:

d) storing an allowable range of the total inductive coupling, e) repeating step a) to obtain an updated master amount, and deciding that the resolver is defective when the updated master amount is outside the allowable range.

8. The method of claim 1, further comprising:

d) storing an allowable range of the total inductive coupling; and e) deciding that the resolver is defective when the current amount of total inductive coupling is outside the allowable range.

9. A resolver controller comprising a power supply circuit for providing an alternating current to one of first and second winding assemblies of a resolver, measurement circuitry for measuring voltage induced in the other of the first and second winding assemblies by the alternating current, and a processor configured:

a) to obtain a master amount of total inductive coupling between the first and second winding assemblies of the resolver from voltage data measured by the measurement circuitry, the total inductive coupling being a sum of squares of voltages induced in the sine and cosine windings of the first winding assembly or a square of a voltage induced in the second winding assembly;

b) to obtain at least one current amount of total inductive coupling at a current instant in time from voltage data measured by the measurement circuitry;

c) to decide that the resolver is defective when a difference between the current amount and the master amount exceeds a predetermined threshold;

d) to store an initial master amount obtained by an initial execution of step a); and e) to repeat step a) to obtain an updated master amount, and to decide that the resolver is defective when a difference between the initial master amount and the updated master amount exceeds a predetermined threshold.

10. The resolver controller of claim 9, wherein the processor is further configured to deduce an angular position of the resolver from the voltage induced in the other of the first and second winding assemblies.

11. A resolver assembly, comprising:

a resolver controller, the resolver controller comprising:

a power supply circuit for providing an alternating current to one of first and second winding assemblies of a resolver, measurement circuitry for measuring voltage induced in the other of the first and second winding assemblies by the alternating current, and a processor configured to obtain a master amount of total inductive coupling between the first and second winding assemblies of the resolver from voltage data measured by the measurement circuitry, the total inductive coupling being a sum of squares of voltages induced in the sine and cosine windings of the first winding assembly or a square of a voltage induced in the second winding assembly, and to obtain at least one current amount of total inductive coupling at a current instant in time from voltage data measured by the measurement circuitry; and to decide that the resolver is defective when a difference between the current amount and the master amount exceeds a predetermined threshold; the processor further configured to store an initial master amount obtained by an initial execution of step a) and to decide that the resolver is defective when a difference between the initial master amount and an updated master amount exceeds a predetermined threshold; and the resolver.

12. The resolver assembly of claim 11, wherein the resolver is associated to a joint of an articulated robot arm.

13. A tangible, non-volatile computer-readable storage medium having stored thereon a plurality of computer executable instructions which, when executed by a processor, cause the processor to obtain a master amount of total inductive coupling between first and second winding assemblies of a resolver from input voltage data, the total inductive coupling being a sum of squares of voltages induced in the sine and cosine windings of the first winding assembly or a square of a voltage induced in the second winding assembly, to obtain at least one current amount of total inductive coupling at a current instant in time from input voltage data, and to decide that the resolver is defective when a difference between the current amount and the master amount exceeds a predetermined threshold, to store an initial master amount obtained by an initial obtaining of the master amount, and to decide that the resolver is defective when a difference between the initial master amount and an updated master amount exceeds a predetermined threshold.

* * * * *